(12) United States Patent
Kraus et al.

(10) Patent No.: US 10,183,287 B1
(45) Date of Patent: Jan. 22, 2019

(54) METHOD OF APPLYING A MULTILAYER WET-ON-WET COATING TO A SUBSTRATE

(71) Applicant: UMICORE AG & CO. KG, Hanau-Wolfgang (DE)

(72) Inventors: John Kraus, Tulsa, OK (US); Marc Williams, Broken Arrow, OK (US)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/642,614

(22) Filed: Jul. 6, 2017

(51) Int. Cl.
| | | |
|---|---|---|
| *B01J 37/02* | (2006.01) | |
| *B01D 53/94* | (2006.01) | |
| *B01J 37/08* | (2006.01) | |
| *B01J 37/34* | (2006.01) | |
| *F01N 3/10* | (2006.01) | |

(52) U.S. Cl.
CPC .......... *B01J 37/0244* (2013.01); *B01D 53/94* (2013.01); *B01J 37/024* (2013.01); *B01J 37/0215* (2013.01); *B01J 37/0228* (2013.01); *B01J 37/0236* (2013.01); *B01J 37/08* (2013.01); *B01J 37/343* (2013.01); *B01D 2255/9022* (2013.01); *F01N 3/10* (2013.01); *F01N 2510/06* (2013.01)

(58) Field of Classification Search
CPC .. B01L 37/00; B01L 37/0215; B01L 37/0228; B01L 37/024; B01L 37/343
USPC ......................................... 427/230–239, 346
See application file for complete search history.

(56) References Cited

U.S. PATENT DOCUMENTS

| | | |
|---|---|---|
| 6,478,874 B1 | 11/2002 | Rosynsky et al. |
| 8,617,496 B2 | 12/2013 | Wei et al. |
| 8,663,588 B2 | 3/2014 | Lindner et al. |
| 8,794,178 B2 | 8/2014 | Mergner et al. |
| 8,906,330 B2 | 12/2014 | Hilgendorff et al. |
| 8,968,690 B2 | 3/2015 | Nunan et al. |
| 9,144,796 B1 * | 9/2015 | Bennett .................. G01N 24/08 |

FOREIGN PATENT DOCUMENTS

| | | |
|---|---|---|
| WO | 99/47260 A1 | 9/1999 |
| WO | 2015/015182 A1 | 2/2015 |
| WO | 2016/023808 A1 | 2/2016 |

* cited by examiner

*Primary Examiner* — William P Fletcher, III
(74) *Attorney, Agent, or Firm* — Smith, Gambrell & Russell, LLP

(57) ABSTRACT

A method of coating a substrate includes distributing a first catalyst slurry having a first catalytic composition and a first initial viscosity within the substrate to form a first catalyst layer within the substrate; adjusting the viscosity of the first catalyst layer such that the first catalyst layer is made to have a first adjusted viscosity that is greater than the first initial viscosity of the first catalyst slurry; distributing a second catalyst slurry having a second catalytic composition and a second initial viscosity within the substrate to form a second catalyst layer within the substrate, the second initial viscosity being made to be less than the first adjusted viscosity; the second catalyst slurry being distributed within the substrate while the first catalyst layer is in a wet state such that the second catalyst layer is formed as a wet-on-wet coating that at least partially overlaps the first catalyst layer.

12 Claims, 1 Drawing Sheet

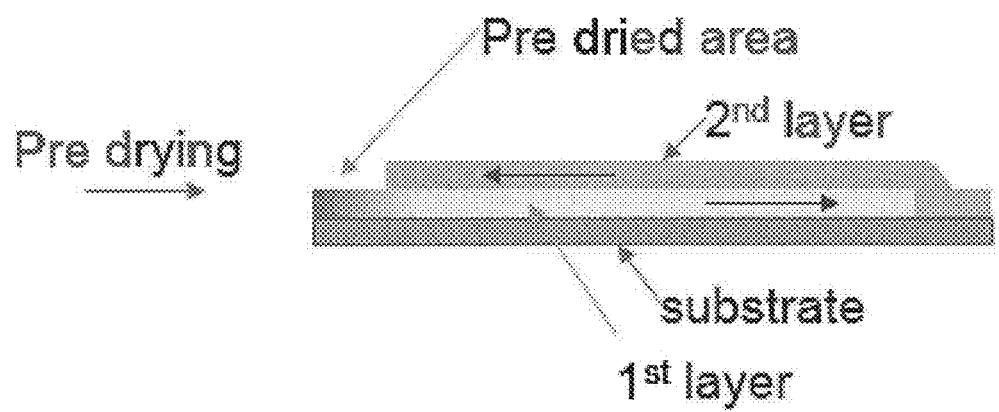

METHOD OF APPLYING A MULTILAYER WET-ON-WET COATING TO A SUBSTRATE

FIELD OF THE INVENTION

The present invention pertains, generally, to a process for loading a substrate with a catalytic material, and particularly, a method for applying multiple layers of catalytic materials to a single substrate.

BACKGROUND OF THE INVENTION

It is well known that fuel combustion yields emissions of pollutants such as unburned hydrocarbons (HC), carbon monoxide (CO), nitrogen oxides (NOx), and particulate matter (PM). In order to improve air quality, practices are commonly taken to lower the emissions of such pollutants by filtering combustion engine exhaust through an exhaust treatment system that is inclusive of a substrate loaded with a catalytic material that is active to at least partially purify the exhaust gases.

The substrates on which catalytic materials are loaded are often cylindrical support bodies, having two end faces, a circumferential surface and an axial length L, and which are traversed from the first end face to the second end face by a multiplicity of channels. Such support bodies are often referred to as honeycomb bodies, may take the form of flow-through honeycomb bodies or wall-flow honeycomb bodies, and may be made of different ceramic or metallic materials such as cordierite, silicon carbide, steel and the like.

The substrates are loaded with the catalytic material applied in the channels of the support body, the application of which may be achieved by several different methods. A common coating method is the use of a catalyst slurry in which one or more catalytic components are suspended in a liquid slurry component (i.e., a washcoat). There are a number of known processes for depositing such a catalyst slurry onto the substrate. For example, the substrate may be immersed in the catalyst slurry or the catalyst slurry may be poured over the substrate. Currently preferred coating methods include aligning the substrate along a vertical axis, with one end face positioned as a bottom end face and the other end face positioned as a top end face, and introducing the catalyst slurry through either the top or bottom end face by application of a pressure differential that promotes a pushing or pulling of the catalyst slurry into the channels of the support body to thereby coat the channels.

It is important the coating concentration of a given layer of catalytic material (i.e., a catalyst layer) be at least equal to a "target uptake", which is understood as the coating concentration in the wet-state that is required for achieving a target catalytic activity in a dry-state. When a coating process includes the application of two or more catalyst layers, it must be understood that there is a target uptake for each individual catalyst layer, as well as a target uptake for the entire coating process. In order to reduce costs, it is preferable the coating concentration of each catalyst layer (and the coating process as a whole) not significantly overshoot the respective target take-up. It is also important that each catalyst layer be applied in a uniform manner, in both the radial and axial directions of the substrate, as irregularities in a catalyst layer may lead to performance problems such as flow restriction and/or inadequate purification of the exhaust gases.

There are a number of different processes that may be used for applying a catalyst layer with a suitable coating concentration and uniformity. In one coating process, such as a flood-fill coating process, an amount of the catalyst slurry that is previously determined to exceed the target uptake is introduced into the channels of the substrate under the force of a pressure differential. This excessive amount may be an amount that exceeds an amount previously determined to correspond with the target uptake; may be a filling amount that is predetermined to correspond with the empty volume of the channels being filled, either in their entirety or to a predetermined height; or may simply be such an amount that is reached by continually introducing the catalyst slurry from one end face until the slurry is determined to have reached or emerged from the opposite end face. Following introduction of the excessive amount of catalyst slurry, there is then performed a purging of the substrate whereby a sufficient amount of the excess catalyst slurry is removed from the substrate under the force of a pressure differential (e.g., by suction or blowout) to thereby open the channels while leaving a catalyst layer along the channels. Thereafter, steps may be taken to introduce or remove further corrective quantities of the catalyst slurry to account for any undershooting or overshooting, so as to adjust the coating concentration to be within an acceptable tolerance of the respective target uptake.

In another coating process, such as a zone coating process, an amount of the catalyst slurry that is previously determined to correspond with the target uptake is introduced into the channels of the substrate under the force of a pressure differential. In this process, since the amount of catalyst slurry is predetermined to correspond with the respective target uptake, the catalyst slurry does not entirely fill the channels, but is instead simply forced to flow along the channel walls to thereby coat the channels. Since the catalyst slurry does not fill the channels, this process does not require a pressure-based purge of the flow channels, though steps may be taken to remove or introduce further corrective quantities of the catalyst slurry to account for any undershooting or overshooting, so as to adjust the coating concentration to be within an acceptable tolerance of the target uptake.

Once a substrate is suitably loaded with the catalyst slurry, the substrate is then dried to evaporate the liquid component of the washcoat and solidify the catalyst layer, and subjected to at least one heat treatment (e.g., calcination) to further fix the layers and activate the catalytic components.

In response to increasingly stringent emissions standards, it has become a common practice to load a substrate with multiple catalytic materials of different though complementing compositions, with the different catalytic materials applied as separate catalyst layers within the channels of the support body. See, for example, U.S. Pat. No. 8,906,330 (Hilgendorff, et al.). In some instances, the catalyst layers are superposed one over another, with the separate layers overlapping either partially or in their entireties. By carefully controlling the formation of the different catalyst layers, there can be produced multilayered catalytic substrates that are specially adapted for performing specific catalytic processes with specific reaction sequences.

However, the loading of a substrate with multiple catalyst layers necessarily results in an increase in production time per loaded substrate, and a decrease in overall production throughput. An example of this is presented in U.S. Pat. No. 8,906,330, wherein the production of a catalytic substrate loaded with three catalyst layers (i.e., an inner layer, a middle layer, and an outer layer) includes the performance of a drying step and a calcining step after the application of each individual layer. Such a coating process is inefficient in that performance of multiple drying and calcining steps significantly increases production time for a single catalytic substrate. Indeed, whereas a catalyst layer can normally be applied as quickly as a few seconds, the performance of separate drying and calcining steps after the formation of each individual layer in the coating process of U.S. Pat. No. 8,906,330 necessitates approximately an additional hour of production time per catalyst layer—which, in the three layer example of U.S. Pat. No. 8,906,330, results in an approximate 200% increase in production time over that which would otherwise be possible if the drying and a calcining steps were performed only after application of all three layers.

Despite the inefficiencies associated therewith, as may be appreciated from the foregoing discussion of U.S. Pat. No. 8,906,330, it has been the conventional understanding that when applying multiple layers of catalytic materials a given layer must first be applied, dried, and calcined before a subsequent layer may be applied. Though not intending to be bound by theory, it is considered that the performance of such intermediate drying and calcining steps has been deemed necessary in the art as the introduction of a subsequent catalyst slurry to a substrate that is already loaded with an non-dried, still-wet catalyst layer has been found to result in the still-wet catalyst layer being partially removed and/or shifted due to forces generated by the pressure differential that is used for introducing the subsequent catalyst slurry. For example, if employing a pressure differential that generates a top-down application of a second catalyst slurry through a top end face of the substrate, then some quantity of a prior applied and still-wet first catalyst layer might be removed from the substrate through the bottom end face; might be shifted into a lower region of the substrate where the first catalyst layer is not intended for application; and/or might be redistributed in a non-uniform manner (e.g., with a gradient such that there is a greater thickness toward the bottom end face and a lesser thickness toward the top end face).

In addition, when applying a subsequent catalyst slurry that is of a different catalytic composition than the prior-applied and still wet catalyst layer, there is a further concern that when the subsequent catalyst slurry is introduced in a manner to overlap the still-wet catalyst layer the wet-on-wet interface of the two layers may promote a comingling of the different catalytic components of the separate layers, thereby contaminating and degrading the catalytic function of one or both layers.

Recently, attempts have been made to reduce the number of drying and/or calcining steps in a coating process. For example, U.S. Pat. No. 9,144,796 (Bennett, et al.) discloses a coating process for applying multiple catalyst layers to a substrate, wherein individual layers are applied in two-steps, with a first portion of a given catalyst slurry introduced from one end face such that the substrate is "part-coated" with a portion of a first catalyst layer, followed by flipping the substrate and subsequently introducing a second portion of that same catalyst slurry from the opposite end face to finish the first catalyst layer. U.S. Pat. No. 9,144,796 proposes reducing the number of steps in such a coating process by foregoing the performance of a drying step between application of the first "part-coated" portion of the first catalyst layer and the subsequent completion of the first catalyst layer though the opposite end face. In particular, U.S. Pat. No. 9,144,796 teaches that the drying step may be omitted between introduction of the two portions of the same catalyst slurry by formulating the catalyst slurry with a rheological modifier that enhances the viscosity of the slurry such that the first "part-coated" portion of a catalyst layer is not unduly disturbed upon introduction of the second portion of the same catalyst slurry through the opposite end face.

However, the coating process disclosed in U.S. Pat. No. 9,144,796 is inefficient in that it continues to require performance of a drying step between introduction of a first catalyst slurry (as applied in two portions) and introduction of a subsequent catalyst slurry which may have a different catalytic composition relative to that of the first catalytic slurry. Though not being bound by theory, it is considered U.S. Pat. No. 9,144,796 continues to require a drying step between introduction of the two separate catalyst slurries in order to forego a wet-on-wet interface between the two different catalyst layers, thereby avoiding the risk of comingling different catalytic components of the two layers, and the potential contamination and degradation of one or both layers.

Accordingly, there remains a need in the art for a method of coating a substrate with multiple catalyst layers that reduces the production time per loaded substrate, thereby permitting a greater overall production throughput, and which also reduces the risk of contamination between two superposed catalyst layers of different compositions.

SUMMARY OF THE INVENTION

The present invention is directed to a method of coating a substrate and a catalytically loaded substrate produced thereby.

The methods disclosed herein may comprise distributing a first catalyst slurry having a first catalytic composition and a first initial viscosity within the substrate to form a first catalyst layer within the substrate; adjusting the viscosity of the first catalyst layer such that the first catalyst layer is made to have a first adjusted viscosity that is greater than the first initial viscosity of the first catalyst slurry; distributing a second catalyst slurry having a second catalytic composition and a second initial viscosity within the substrate to form a second catalyst layer within the substrate, the second initial viscosity being made to be less than the first adjusted viscosity; the second catalyst slurry being distributed within the substrate while the first catalyst layer is in a wet state such that the second catalyst layer is formed as a wet-on-wet coating that at least partially overlaps the first catalyst layer.

In some examples the first and second catalytic compositions may be the same, while in other examples the first and second catalytic compositions may differ. Generally, the first and second catalytic compositions both comprise one or more rheology modifiers, such that the first and second catalytic compositions have thixotropic rheologies with a reversible shear-thinning hysteresis. The one or more rheology modifiers may be a linear or branched-chain polyfunctionalized organic molecule having two to twelve carbon atoms in the chain ($C_n$; wherein $2 \leq n \leq 12$) and a carbon backbone that is saturated or unsaturated in either a cis- or trans-configuration. The organic molecule is functionalized with at least one carboxylic acid moiety, and at least one additional functional moiety that is a carboxyl, a hydroxyl, or a carbonyl. In some examples, if the second catalyst slurry will be the last-introduced catalyst slurry to be into the substrate to form the last catalyst layer, then the second catalytic composition may forego a thixotropic rheology.

Prior to introducing the respective first and second catalyst slurries into the substrate, the respective catalyst slurry may be held in a containment vessel that is in fluid-flow communication with the substrate, and a shearing force may be applied to the catalyst slurry, while held in the containment vessel, to level the catalyst slurry within the containment vessel. The shearing force may be applied by inducing vibration or applying mechanical shear to the containment vessel; or applying an ultrasound energy to the catalyst slurry and/or the containment vessel.

The respective first and second catalyst slurries may be introduced into the substrate by applying a shearing force that acts to reduce the viscosity of the respective catalyst slurry to a sufficient level such that that catalyst slurry flows into and is distributed within the passageways (e.g., pore channels) of the substrate to form respective first and second catalyst layers. After adequately distributing the respective catalyst slurry to form a targeted catalyst layer, application of the shearing force is ceased to thereby increase the viscosity of the respective catalyst composition and inhibit mobility of the respective catalyst layer.

The respective first and second catalyst slurries may be distributed along the entire length of the substrate, or along less than the entire length of the substrate, such that the respective catalyst layers are formed either along the entire length of the substrate, or along less than the entire length of the substrate.

Following the distribution of a single catalyst slurry within the substrate to form a respective catalyst layer, and prior to introduction of a subsequent catalyst slurry within the substrate, an intermediate viscosity adjustment process may be performed to adjust the viscosity of the catalyst composition of the applied catalyst layer. The viscosity adjustment process removes a portion of a liquid component of a washcoat of the catalyst composition of the applied catalyst layer, though leaves sufficient liquid component such that the catalyst layer remains in a wet state. The viscosity adjustment process may include the application of an airflow through the channels of the substrate, application of a microwave energy or an infra-red light, or the use of a heated washcoat, a heated substrate, or one or more low volatility additives.

In some examples, the method may further comprise adjusting a viscosity of the second catalyst composition such that the second catalyst layer has a second adjusted viscosity that is greater than the second initial viscosity of the second catalyst slurry; and distributing a third catalyst slurry having a third catalytic composition and a third initial viscosity within the substrate to form a third catalyst layer within the substrate, the third catalytic composition differing from the second catalytic composition, and the third initial viscosity being made to be less than the second adjusted viscosity; the third catalyst slurry being distributed within the substrate while the second catalyst layer is in a wet state such that the third catalyst layer is formed as a wet-on-wet coating that at least partially overlaps the second catalyst layer.

The method may further comprise distributing three or more catalyst slurries within the substrate to form three or more catalyst layers; adjusting, after the formation of each respective catalyst layer and prior to the introduction of a subsequent catalyst slurry, a viscosity of the catalytic composition of the respective catalyst layer such that the viscosity of the catalyst layer is less than the initial viscosity of the catalyst slurry that was introduced to form that respective catalyst layer; each successive catalyst slurry being introduced and distributed within the substrate while at least the immediately prior applied catalyst layer is in a wet state such that each successive catalyst layer is formed as a wet-on-wet coating that at least partially overlaps the immediately prior applied catalyst layer.

The methods disclosed herein may further comprise, coating the substrate with a predetermined number of catalyst layers to form a loaded substrate; and drying and/or calcining the loaded substrate only after all predetermined number of catalyst layers are coated on the substrate. Specifically, the methods disclosed herein may comprise the production of a catalytically loaded substrate wherein only a single drying step, a single calcining step, and/or a single combined drying and calcining step is performed.

Both the foregoing general description and the following detailed description are exemplary and explanatory only and are intended to provide further explanation of the invention as claimed.

BRIEF DESCRIPTION OF THE DRAWINGS

Further features and advantages of the invention can be ascertained from the following detailed description that is provided in connection with the drawings described below:

FIG. 1 is a schematic representation of a substrate having a multiple catalyst coating according to one embodiment of the present invention.

DETAILED DESCRIPTION OF THE INVENTION

The following disclosure discusses the present invention with reference to the examples discussed herein to aid in an understanding of the present invention. It is understood that the invention is not limited by the examples, and that all alternatives, modifications and equivalents which would be obvious to those of ordinary skill upon reading the disclosure are included within the spirit and scope of the present invention.

This disclosure is not a primer on the process for coating substrates, and basic concepts known to those skilled in the art have not been set forth in detail.

The present invention provides a method of coating a substrate with multiple catalyst layers; and, in particular, the application of multiple catalyst layers of different compositions, without the performance of any intermediate drying or calcining steps between introduction of the separate catalyst slurries and formation of successive catalyst layers.

The substrate has a support body having two end faces and an axial length L, and is traversed from the first end face to the second end face by a multiplicity of channels. The support body may be either a flow-through honeycomb body or a wall-flow honeycomb body, may be made of any suitable material, and may be cylindrical or any other preferred shape. The process for coating the substrate comprises the following steps:

a) prepare a first catalyst slurry for application as a first catalyst layer, and prepare a second catalyst slurry for application as a second catalyst layer;
b) position a substrate in a vertical orientation;
c) introduce and distribute the first catalyst slurry into channels of the substrate;
d) adjust the viscosity of the applied first catalyst layer;
e) introduce and distribute the second catalyst slurry into channels of the substrate;
f) dry the catalytically loaded substrate; and
g) calcine the catalytically loaded substrate.

It will be appreciated that the steps of the coating process need not be performed in the precise order disclosed, that some steps may be performed in a different sequence, and that some steps may be performed in parallel (in whole or in part). For example, the timing with which preparation of the catalyst slurries and orientation of the substrate are performed, as in steps (a) and (b), may be changed as needed.

Also, drying and calcining of the substrate, as in steps (f) and (g), may overlap in part or in their entireties (which may include a coterminous performance thereof).

Though the foregoing example addresses an instance where multiple catalyst slurries are introduced to form multiple catalyst layers, the coating method may include the preparation of three or more catalyst slurries for forming three or more catalyst layers. Also, when applying three or more catalyst layers, adjustment of the viscosity of the applied catalyst layer, as in step (d), is repeated between the introduction of each successive catalyst slurry, such as the performance of step (d) between steps (c) and (e), whereby the viscosity of an immediately prior-applied catalyst layer is adjusted in advance of introducing an immediately subsequent catalyst slurry.

A characteristic of the present invention is that each subsequent catalyst slurry is introduced into the substrate to form a subsequent catalyst layer while the immediately prior-applied catalyst layer is still in a wet-state, though with the viscosity of the immediately prior-applied catalyst layer having been adjusted prior to introduction of the subsequent catalyst slurry. This is true for the introduction of each successive catalyst slurry. That is, in a preferred embodiment, there is not performed any drying step or calcining step until after all desired catalyst layers are applied to the substrate.

(A) Preparation of First and Second Catalyst Slurries

Each catalyst slurry for application to the substrate for formation of a separate catalyst layer is specially made to comprise a washcoat in which there is suspended one or more catalytic components, with each catalyst slurry being made to have a thixotropic rheology such that each slurry displays a reversible shear-thinning hysteresis whereby the viscosity of a given slurry decreases under application of a shear force and subsequently increases upon cessation of the shear force.

It will be understood that the viscosities of the catalyst compositions used herein will be made to vary. For example, prior to introduction into a substrate, the catalyst composition of a catalyst slurry will have a predetermined initial viscosity $\eta$. After introduction and distribution of the catalyst slurry in the substrate to form a catalyst layer, and following performance of an intermediate viscosity adjustment step, the catalyst composition of the applied catalyst layer will have an adjusted viscosity $N$ that is greater than the predetermined initial viscosity $\eta$ (i.e., $N > \eta$). In some instances, following introduction and distribution of the catalyst slurry in the substrate to form a catalyst layer, though prior to performance of an intermediate viscosity adjustment step, an applied catalyst layer that interfaces with a porous substrate surface may be influenced by the porous nature of the support body to have an altered viscosity $\eta'$ that is greater than the predetermined initial viscosity $\eta$, though less than the adjusted viscosity $N$ (i.e., $N > \eta' > \eta$).

When preparing the first and seconds catalyst slurries in accord with the above example, the first catalyst slurry is made to have a first predetermined initial viscosity $\eta_1$ and the second catalyst slurry is made to have a second predetermined initial viscosity $\eta_2$. Based on preliminary data obtained in advance, it will be known that a first catalyst layer formed of the first catalyst slurry, following performance of an intermediate viscosity adjustment step, will be made to have a first predetermined adjusted viscosity $N_1$ (i.e., $\eta_2 < N_1$). The preliminary data may be obtained in advance from preliminary test trials, from simulated testing data, or from tabulated data. With the preliminary data, the second initial viscosity $\eta_2$, of the second catalyst slurry, is made to be less than the first predetermined adjusted viscosity $N_1$ (i.e., $\eta_2 < N_1$). When using three or more catalyst slurries, each given catalyst slurry is made to have a predetermined initial viscosity $(\eta_i)$ that is less than the predetermined adjusted viscosity of the immediately prior-applied catalyst layer (i.e., $\eta_i < N_{i-1}$).

The catalyst slurries are made to have thixotropic rheologies such that the various catalyst layers: i) have a high yield point (e.g., greater than 130 Pascals); ii) have a thixotropic rheology that is pseudoplastic in nature; and iii) demonstrate a shear stress hysteresis behavior, with a reducing shear rate. Such properties can be influenced by inducing high energy states in the catalyst slurries during processing or through the use of additives in the composition of the catalyst slurries. For example, temperature, particle size, pH level, raw material variation, and the order of adding composition components can be changed to produce desirable rheological properties. However, it has been observed that such methods can be highly variable in a production environment and may have undesirable side effects.

For instance, varying the particle size distribution such that the $d_{90}$ is range is decreased from 16-28 microns to less than 14 microns can produce favorable rheological behavior for wet-on-wet applications, though it may also introduce the risk of adhesion failure in addition to consuming excessive equipment capacity. Similarly, though the pH level may be varied to produce favorable coating rheological behavior, the change is often temporary and may be offset over time by digestion of the primary catalyst slurry components. Temperature may also be varied to influence viscosity, along with low volatility additives though changes in temperature present difficulties in achieving processing targets and may compromise adhesion properties of the catalyst slurries at extreme operating limits.

For these reasons, use of rheological modifier additives is preferred for managing the viscosity properties of the catalyst slurries to achieve the viscosity relationship among the several catalyst slurries. Suitable rheology modifiers may come from one of several classes of chemical compounds which can impart the desired shear-thinning properties.

A first set of compounds that may provide suitable rheology modifiers are linear or branched-chain poly-functionalized organic molecules having two or more carbon atoms in the chain, with up to about 12 carbon atoms ($C_n$; wherein $2 \leq n \leq 12$). The carbon backbone may be saturated or unsaturated in either the cis- or trans-configuration. The organic molecule may be functionalized with at least one carboxylic acid moiety, and at least one additional functional moiety from the following list: carboxyl, hydroxyl, or carbonyl. The number of functional moieties can range from 2 to n.

A second set of compounds that may provide suitable rheology modifiers are based on salts of basic quaternary amines. Here one or more quaternary amine groups are attached to four carbon chains having length of $C_n$, where $1 \leq n \leq 5$. This cation is balanced as a salt using, but not limited to, one of the following anions: hydroxide, fluoride, chloride, bromide, iodide, carbonate, sulfate, sulfite, oxalate, maleate, phosphate, aluminate, silicate, borate, or other suitable organic or inorganic counter ions.

A third set of compounds that may provide suitable rheology modifiers includes inorganic bases taken from, but not limited to the following list: lithium hydroxide, sodium hydroxide, potassium hydroxide, magnesium hydroxide, calcium hydroxide, strontium hydroxide, and barium hydroxide.

A fourth set of compounds that may provide suitable rheology modifiers includes simple salts of transition or rare earth elements, including, but not limited to the following: nitrates, carbonates, sulfates, phosphates, borates of rare earth elements from atomic number 57 (La) to 71 (Lu) and including Sc, Y, Ti, Zr, and Hf.

The rheological properties of the various catalyst slurries may be adjusted by providing the washcoat of the respective catalyst slurries with any appropriate combination of the above referenced compounds, including combinations of compounds in a common set (e.g., two or more compounds from the second set) and combinations of compounds from different sets (e.g., one compound from the first set; and two compound from the third set).

The rheology modifiers are added in weight percent concentrations of 0.01% up to 10%, preferably from about 0.1% to about 7.5%; and more preferably from about 0.1% to about 5%. The predetermined initial viscosities of the separate catalyst slurries, and the differences between the respective initial viscosities, may be adjusted by selecting different rheology modifiers (or combinations thereof) and/ or adjusting the weight percent of the one or more rheology modifiers for each catalyst slurry.

The catalyst slurries of the present invention not only have the aforementioned rheological properties, but also exhibit shear thinning behavior at a solids content that is 10% to 20% higher than that normally required for a standard flood-fill coating process. Preferably, the catalyst slurries are made to have a solids content of greater than about 40 wt-%; more preferably greater than about 45 wt-%; and yet more preferably will have a solids content of about 48 wt-% to about 52 wt-% depending on targeted wet uptake.

The solids content requirement of the present invention renders a number of potential rheological modifiers unsuitable for use with the catalyst slurries of the present invention due to their unfavorable response. For example, while a trial using an additive in the polysaccharide family was found to yield favorable behavior at lower washcoat solids content (e.g., <25 wt-%), it was found that at the higher solids content required for wet-on-wet coating (e.g., >40% wt-%), or even at the normal solids content for a standard coating process (e.g., >30% wt-%), the catalyst slurry was found to exhibit dilatant behavior which made application of the coating to the substrate impossible. It was further found that the polysaccharide additive did not fully decompose upon calcination; leaving a residue that poses adhesion and cosmetic concerns, and which created uncertainty as to the compositional distribution of active components.

(B) Positioning of Substrate

A substrate to be coated with the catalyst slurries according to the present invention is positioned in a coating device with a vertical orientation, such that a first end face is positioned as a bottom end face and a second end face is positioned as a top end face. The coating device may operate to perform either a bottom-up or top-down introduction of a catalytic slurry, with the catalyst slurry held in a containment vessel such as a tank below the bottom end face or an annular wall that is temporarily affixed to the top end face of the substrate. Preferably, the coating is done top-down.

(C) Introduction and Distribution of First Catalyst Slurry

The first catalyst slurry may be introduced into the vertically oriented substrate through the top end face, under the force of a pressure differential that induces a top-down application, or through the bottom end face, under the force of a pressure differential that induces a bottom-up application. Again, the top-down application is preferred.

Prior to introduction into the substrate, the first catalyst slurry is delivered to a containment vessel that is adapted for fluid-flow communication with the substrate. When introduced through the bottom end face, the containment vessel may be a tank on which the substrate is releasably mountable; and when introduced through the top end face, the containment vessel may be an annular wall that is releasably mountable to the top end of the substrate. Once received in the containment vessel, and prior to introduction to the substrate, the first catalyst slurry is preferably distributed and uniformly leveled by application of a shearing force, such as by inducing a vibration of the first catalyst slurry and/or the containment vessel as a whole (e.g., a mechanized vibration; application of ultrasound energy; etc.). Leveling of the catalyst slurry in the containment vessel promotes an even introduction of the catalyst slurry along the channel walls of the substrate, and formation of a uniform catalyst layer.

If introducing the first catalyst slurry through the top end face of the substrate, with a top-down application, then the initial viscosity $\eta_1$ of the first catalyst slurry is made sufficiently high that the slurry does not begin flowing downward into the substrate until a predetermined shear force is applied; the predetermined shear force being greater than the shear force that is sufficient for leveling the catalyst slurry within the annular wall. For example, a relatively low shear force may be applied for leveling the first catalyst slurry by application of a relatively low shear vibration force, and a relatively high shear force may be applied for introducing the first catalyst slurry into the substrate by application of a relatively high shear pressure differential force.

Due to the thixotropic rheology and time dependent shear thinning behavior thereof, introduction of the first catalyst slurry into the substrate may be finely controlled by application of a pressure differential at a magnitude and a duration that is calculated in advance to introduce the catalyst slurry into the substrate at a predetermined flow rate. In this way, distribution of the first catalyst slurry along the channels of the substrate may be predictably controlled to provide increased precision in the formation of a first catalyst layer along a targeted precision zone or length of the substrate. The reversible nature of the thixotropic rheology, whereby the viscosity of the first catalyst slurry increases upon cessation of the shear force, promotes a controlled fixing of the applied first catalyst layer at a target region of the substrate.

Preferably, the first catalyst slurry is introduced under conditions that are predetermined to form a first raw catalyst layer (i.e., wet-state catalyst layer) along a length of the channels that is less than 100% of the total length of the substrate; more preferably a length equal to or greater than about 85% and less than 97%; and yet more preferably a length equal to or greater than about 90% and equal to or less than about 95%, although any length less than 100% may be desirable based on application.

It is preferable the first catalyst layer be formed along less than 100% of the total length of the substrate. As already mentioned the absorption of liquid from the washcoat by the porous substrate causes a reduction in the overall liquid component of the washcoat of the first catalyst layer, such that the composition of the first catalyst layer is made to have a higher solids loading as compared to the solids loading of the first catalyst slurry that is introduced into the substrate. In this way, the first applied catalyst layer is effectively made to have an altered viscosity $\eta_1'$ that is increased relative to the initial viscosity $\eta_1$ of the first catalyst slurry (i.e., $\eta_1'>\eta_1$), which results in the applied first catalyst layer having an increased yield stress, such that any further movement of the catalytic material of the first catalyst layer will require the application of a greater shear force than that which was required for introducing the first catalyst slurry into the substrate. The uncoated portion of the total length of the substrate may further aid to alter the viscosity of a second catalyst slurry at this position if the second catalyst slurry is submitted through the opposite end of the substrate over the first one as depicted in FIG. 1.

Targeting less than 100% of the total length of the substrate also provides further benefits including, though not limited to, mitigating the unintended spillover of catalyst slurry through the opposite end face of the substrate; and suppressing particle size and compositional drift issues (e.g., formation of a gradient), thereby promoting a uniform application of the applied catalyst layer.

(D) Viscosity Adjustment

Once the first catalyst slurry is applied to form a first catalyst layer, an intermediate viscosity adjustment step is performed to adjust the viscosity of the applied catalyst layer by removing a portion of the liquid component of the washcoat of the applied catalyst layer. It is to be understood that removing a portion of the liquid component of the washcoat is different from a drying process, in that the catalyst layer remains in a wet-state following removal of the portion of liquid component, though the catalyst layer is effectively made to have a higher solids weight loading, and thus an adjusted viscosity $N_1$ that is greater than the predetermined initial viscosity $\eta_1$ ($N_1 > \eta_1$), as well as a higher yield stress. When talking about drying in this application a removal of liquid content of more than 50% of the total liquid content per unit length of the catalyst slurry on the substrate is envisaged, whereas liquid removals of 50% or less of the total liquid content per unit length on the substrate are understood as resulting in a catalyst layer that is still in a wet-state following such removal.

One method for removing a portion of the liquid component is the application of a gas flow, e.g. an airflow, through the channels of the substrate via either a vacuum suction or a blowing of compressed air. The airflow may be applied for a duration of less than about 1 minute, preferably less than about 45 seconds, and more preferably less than about 30 seconds; and may be performed with ambient air or compressed air, with the air either heated or unheated.

Alternative methods for the removal of a portion of the liquid component may include the application of a dried airflow, microwave energy, infra-red light, or the use of a heated washcoat, a heated substrate, or one or more low volatility additives.

(E) Introduction and Distribution of Second Catalyst Slurry

The second catalyst slurry may be introduced into the vertically oriented substrate through the top end face, under the force of a pressure differential that induces a top-down application, or through the bottom end face, under the force of a pressure differential that induces a bottom-up application.

Introduction of the second catalyst slurry may be performed from either the same or opposite end face as that from which the first catalyst slurry was introduced. If introducing the second catalyst slurry from the opposite end face from which the first catalyst slurry was introduced, then the second catalyst slurry may be introduced either with an opposite flow direction as that with which the first catalyst slurry was introduced (e.g., with a bottom-up flow for the second catalyst slurry when the first catalyst slurry was introduced with a top-down flow), or the substrate must be rotated so as to reverse the vertical orientation thereof. If rotating the substrate, then the rotation step may be performed either before or after the intermediate step of removing a portion of the liquid component. In some examples, performance of the rotation step may overlap, in part or in its entirety, with performance of the intermediate viscosity adjustment step.

As with the first catalyst slurry, the second catalyst slurry is also delivered to a containment vessel that is adapted for fluid-flow communication with the substrate. Once received in the containment vessel, and prior to introduction to the substrate, the second catalyst slurry is also preferably distributed and uniformly leveled by application of a shearing force. As with the first catalyst slurry, if introducing the second catalyst slurry through the top end face of the substrate, through a top-down application, then the initial viscosity $\eta_2$ of the second catalyst slurry is made sufficiently high that the slurry does not begin flowing downward into the substrate until a predetermined shear force is applied. The predetermined shear force being greater than the shear force that is sufficient for leveling the catalyst slurry within the annular wall.

Again, the predetermined initial viscosity $\eta_2$ of the second catalyst slurry is made to be lower than the predetermined adjusted viscosity $N_1$ of the first catalyst slurry layer. As a result, the shear force that is needed for introducing the second catalyst slurry into the substrate is less than that shear force that would noticeably disturb the applied first catalyst layer which has been adjusted to have a yet higher viscosity and a yet higher yield stress as compared to that of the first catalyst slurry.

As with the first catalyst slurry, the thixotropic rheology and time dependent shear thinning behavior of the second catalyst slurry enable fine control and increased precision in the introduction of the second catalyst slurry and formation of a second catalyst layer along a targeted precision zone or length of the substrate; with the reversible nature of the thixotropic rheology promoting a controlled fixing of the applied second catalyst layer at a target region of the substrate.

Preferably, the second catalyst slurry is introduced under conditions that are predetermined to form a second raw catalyst layer along a length of the channels that is less than 100% of the total length of the substrate; more preferably a length equal to or greater than about 85% and less than 97%; and yet more preferably a length equal to or greater than about 90% and equal to or less than about 95%. Formation of the second catalyst layer along less than 100% of the total length of the substrate is preferred for the same reasons as discussed relative to formation of the first catalyst layer along less than 100% of the total length.

If introducing three or more catalyst slurries for the formation of three or more catalyst layers, then the sequence of introducing a catalyst slurry, removing a portion of the liquid component of the introduced catalyst slurry, and introducing a subsequent catalyst slurry—i.e., the sequence of steps (c)-(e)—is repeated for each successive pair of catalyst slurries. Preference may be given to introducing one or more or all of the separate catalyst slurries through a common end face. Use of a common end face for introduction of multiple catalyst slurries may facilitate use of any remaining absorptive capability at the uncoated length of the substrate (i.e., that portion exceeding the less than 100% target coating length) to further absorb liquid from the washcoats of subsequent catalyst slurries, thereby promoting higher viscosities and higher yield stresses in the subsequent catalyst layers, which in turn promotes a controlled fixing of the subsequent catalyst layers at their respective target regions of the substrate.

(F) Drying the Catalytically Loaded Substrate

Once the substrate is suitably loaded with all intended catalyst layers, the substrate is then dried to evaporate the remaining liquid in each of the catalyst layers, and solidify each of the catalyst layers. For example, the substrate may be subjected to an oven cycle at a temperature greater than 100° C. The oven dwelling duration for the substrate will be a time that is calculated in advance to remove the remaining liquid from the washcoat of each catalyst layer loaded on the substrate, and will therefore be dependent on the number of separate catalyst layers loaded on the substrate and the liquid loading of the washcoat in each respective layer.

Advantageously, when the intermediate viscosity adjustment step performed between the application of successive catalyst layers is performed by removing a portion of the liquid component in the washcoats, the fully loaded substrate will then have a reduced overall liquid loading as compared to that which would otherwise have resulted without such an intermediate viscosity adjustment step, and the drying step may then be performed with a lesser oven dwelling time.

Initially, it was expected that the application of pressure differential forces for introducing a subsequent catalyst slurry would induce an undesired disturbance of a still-wet, prior-applied catalyst layer. Surprisingly, however, the inventors found that introduction of a subsequent catalyst slurry can be performed with a pressure differential of such significantly reduced magnitude and/or duration that a prior-applied still-wet catalyst layer is not noticeably disturbed. While not being bound by theory, it is believed this is made possible by a number of factors.

First, by preparing each subsequent catalyst slurry with an initial viscosity that is lower than the predetermined adjusted viscosity of the immediately prior applied catalyst layer, the shear force that is needed for introducing each subsequent catalyst slurry is made to be less than that shear force that would noticeably disturb the respectively prior applied catalyst layer, thereby avoiding unintended shifts in each of the prior applied catalyst layers.

Also, it is thought that introduction of the second catalyst slurry may be achieved with a yet lower pressure differential force due to that second slurry encountering a relatively lower flow resistance as it is introduced along a wet-on-wet interface with the still-wet first catalyst layer, whereas introduction of the first catalyst layer is thought to require a relatively greater pressure differential force due to it encountering a relatively higher flow resistance as it is introduced along a porous interface of the substrate channels. Similarly, it is thought that introduction of each successive catalyst slurry to a prior-applied still-wet catalyst layer may be achieved with a lower pressure differential due to a relatively lower flow resistance from a wet-on-wet application, as compared to a higher pressure differential that would be required as a result of a relatively higher flow resistance that would otherwise be expected from applying a subsequent catalyst slurry along a prior-applied dried catalyst layer.

In addition, it is considered that changing the prior-applied catalyst layers to have increased viscosities and yield stresses (e.g., by removal of liquid through absorption at an uncoated length of the substrate; by performance of the intermediate viscosity adjustment step; etc.) inhibits disturbance to those prior-applied catalyst layers from the pressure differential forces that are used for introducing the subsequent catalyst slurries.

Thus, it is considered that the controlled distribution of a subsequent catalyst slurry over a prior-applied still-wet catalyst layer, without noticeable disturbance of the prior-applied still-wet catalyst layer, may be promoted by synergism between: preparing subsequent catalyst slurries to have lower predetermined initial viscosities than the predetermined adjusted viscosities of prior applied catalyst layers; performing intermediate viscosity adjustment steps to increase the viscosity of prior applied catalyst layers (e.g., by removing a portion of the liquid component thereof); and performing a wet-on-wet application of subsequent catalyst slurries.

Although the present invention is described with reference to particular examples, it will be understood to those skilled in the art that the scope of the invention is not limited to the disclosed examples; and that the scope of the invention may encompass additional embodiments embracing various changes and modifications relative to the examples disclosed herein without departing from the scope of the invention as defined in the appended claims and equivalents thereto.

For example, though the disclosure above addresses examples wherein each catalyst slurry is made to have a thixotropic rheology with a reversible shear-thinning hysteresis; it will be appreciated that the catalyst slurry that will be last-introduced into the substrate, and which will form the last catalyst layer, may forego such a thixotropic rheology. Nonetheless, it may be advantageous to provide the catalyst slurry that will be last-introduced into the substrate, and which will form the last catalyst layer, with a thixotropic rheology as this may, for example, reduce drying time.

Also, though the disclosure addresses examples where each catalyst layer is formed by introduction of a catalyst slurry through a single end face of a substrate, with the catalyst layer preferably extending less than the full length of the substrate; it will be appreciated that an individual catalyst layer may be formed by introducing a first quantity of a catalyst slurry through a first end face and then introducing a second quantity of the same catalyst slurry through the opposite end face, so as to form an individual catalyst layer that extends along the entire length of the substrate, with the first and second quantities being applied so as to overlap one another by up to 20%; preferably up to 10%; and more preferably up to 5%.

In a further advantageous alternative, the process described above can be modified in that after introducing and distributing a first catalyst slurry—sequence step (c)—a focused adjustment step (e.g. as step (d)) may be performed to remove a portion of the liquid content of the washcoat only at a predetermined zone of an applied catalyst layer. Without being bound by theory, following distribution of the first catalyst slurry on the substrate to form a first catalyst layer, a focused adjustment step may be performed by injecting a liquid removal medium (e.g., a gas flow) into an end of the substrate to effect a liquid removal in an end zone of the applied catalyst layer to form a focus adjusted zone at the end of the catalyst layer corresponding to the end of the substrate at which the liquid removal medium is introduced, as illustrated in FIG. 1. As used herein, such a focus adjusted zone is preferably a zone that experiences a reduction of liquid content of 10% or less per unit length. As such, while a focus adjusted zone will have a reduced liquid content, it is understood that such a zone nonetheless remains in a wet-state following the focused adjustment step.

In examples where there are to be formed three or more catalyst layers, such a focused adjustment step may be performed on each catalyst layer with the exception of the final catalyst layer. A focus adjusted zone formed in this manner may be used to control placement of a subsequent catalyst slurry—e.g., as in sequence step (e)—that is introduced and distributed over a prior-applied catalyst layer having such a focus adjusted zone to prevent the subsequent layer from exiting the opposite end of the substrate body during introduction and distribution thereof.

It is expressly noted that this focused adjustment step may be either a special form of the viscosity adjustment step— i.e., sequence step (d)—or it may be performed as an additional step apart from the viscosity adjustment step (d) that can be used to further improve the process of the present invention. However, this focused adjustment step may also be applied independently from the present invention in order to improve the accuracy of coating processes where two or more layers are coated one over another without performing a complete layer-drying step between application of the separate layers. It is again to be understood that removing a portion of the liquid component of the washcoat is different from a drying process, in that the catalyst layer may remain in a wet-state following removal of a portion of liquid component. Again, when talking about drying in this application a removal of liquid content of more than 50% of the total liquid content per unit length of the catalyst slurry on the substrate is envisaged, whereas liquid removals of 50% or less of the total liquid content per unit length are understood as resulting in a catalyst layer that is still in a wet-state following such removal. This advantageous modification will be explained in more detail below.

In examples that include a focused adjustment step, there is provided a method of coating a substrate, comprising: distributing a first catalyst slurry having a first catalytic composition and a first initial viscosity within the substrate to form a first catalyst layer within the substrate; adjusting a viscosity of the first catalyst layer such that the first catalyst layer is made to have a first adjusted viscosity that is greater than the first initial viscosity of the first catalyst slurry; performing a focused adjustment step to remove a portion of liquid content at a specified location to achieve a focus adjusted zone; and distributing a second catalyst slurry having a second catalytic composition and a second initial viscosity within the substrate to form a second catalyst layer within the substrate, wherein the second catalytic composition differs from the first catalytic composition, and the second initial viscosity is less than the first adjusted viscosity; and wherein the second catalyst slurry is distributed within the substrate while the first catalyst layer remains in a wet-state such that the second catalyst layer is formed as a wet-on-wet coating that at least partially overlaps the first catalyst layer; and wherein optionally the first and second catalytic compositions both comprise one or more rheology modifiers. Again, the focused adjustment step for achieving a focus adjusted entrance zone may be performed as part of the viscosity adjusting step, or as a separate step, and is conducted each time prior to a subsequent catalyst slurry is coated over a preceding catalyst layer. In such a way multiple catalyst layers may be coated one atop another without need of a drying step in-between.

A substrate to be coated with the catalyst slurries according to this modification is positioned in a coating device with a vertical orientation, such that a first end face is positioned as a bottom end face and a second end face is positioned as a top end face. The coating device may operate to perform either a bottom-up (U.S. Pat. No. 8,794,178 B2; U.S. Pat. No. 6,478,874) or top-down (WO 99/47260 A1) introduction of a catalytic slurry, with the catalyst slurry held in a containment vessel such as a tank below the bottom end face or an annular wall that is temporarily affixed to the top end face of the substrate. The first catalyst slurry may be introduced into the vertically oriented substrate through the top end face, under the force of a pressure differential that induces a top-down application, or through the bottom end face, under the force of a pressure differential that induces a bottom-up application. Preferably, the coating is done top-down.

Prior to introduction into the substrate, the first catalyst slurry is delivered to a containment vessel that is adapted for fluid-flow communication with the substrate. When introduced through the bottom end face, the containment vessel may be a tank on which the substrate is releasably mountable; and when introduced through the top end face, the containment vessel may be an annular wall that is releasably mountable to the top end of the substrate. Once received in the containment vessel, and prior to introduction to the substrate, the first catalyst slurry is preferably distributed and uniformly leveled by application of a shearing force, such as by inducing a vibration of the first catalyst slurry and/or the containment vessel as a whole (e.g., a mechanized vibration; application of ultrasound energy; etc.). Leveling of the catalyst slurry in the containment vessel promotes an even introduction of the catalyst slurry along the channel walls of the substrate, and formation of a uniform catalyst layer.

According to this modification the initial viscosity of the first catalyst slurry should be low enough to be coatable on the substrate. Following distribution of the first catalyst slurry within the substrate to form a respective catalyst layer, and prior to introduction of a subsequent catalyst slurry within the substrate, an intermediate viscosity adjustment happens to adjust the viscosity of the catalyst composition of the applied catalyst layer. The viscosity adjustment removes a portion of a liquid component of a washcoat of the catalyst composition of the applied catalyst layer, though leaves sufficient liquid component such that the catalyst layer remains in a wet state. This may be supported upon coating by capillary forces of the porous substrate (i.e., rendering an altered viscosity). The substrate sucks liquid out of the first catalyst slurry leading to an altered first viscosity of the first catalyst layer ($\eta'$). Preferably, this measure alone (i.e., without the need of adding any rheology modifiers) leads to a sufficient viscosity of the first catalyst slurry on the substrate to adjust the first viscosity and/or do a focused adjustment step (step (d)). The second catalyst slurry has an initial viscosity lower than the adjusted viscosity of the first catalyst layer. Hence, care should be taken to select an initial viscosity of the first catalyst slurry that is sufficiently high from the onset such that following coating of the first catalyst slurry, and subsequent viscosity alteration and viscosity adjustment thereof, the reduced viscosity of the first applied catalyst layer remains sufficiently high so as to not undesirably restrict the available catalysts that may be used as the second catalyst slurry that will have an initial viscosity yet lower than the reduced viscosity of the first applied catalyst layer.

Besides acid or basic additives that only adjust the pH, the water content itself, surfactants etc., rheology modifiers can serve to establish the correct viscosity in this manner. As such, compounds such as those disclosed in WO 2016/023808 A, U.S. Pat. No. 9,144,796 B1, and literature cited therein, for intensifying a pseudoplastic behavior of a washcoat may be used. Rheological aids for setting a pseudoplastic behavior have long been known. An overview of useful rheology modifiers can be found in the publication of D. Brown and M. Rosen (The Rheology Modifier Handbook Author: David B. Brown and Meyer R. Rosen ISBN 0-8155-1441-7 Published: 1999). Furthermore, the list of compounds depicted in this application can render the washcoat even more susceptible for such pseudoplastic behavior.

As said subsequently to introduction of the first catalyst slurry, a viscosity adjustment step is performed to the introduced first catalyst slurry. Preferably, only a focused adjustment step is performed to form a focus adjusted zone. This can be done by introducing a liquid removing medium (e.g., a gas stream, preferably compressed air), in either the opposite or the same direction as the application of the first catalyst slurry. Introduction of the liquid removing medium removes a portion of the liquid from the side at which the liquid removing medium is introduced thereby providing a focus adjusted zone having a lesser water content per unit length of the catalyst layer on the substrate as compared to the water content per unit length of the remaining portion of the coated catalyst slurry. In the gas entrance this focused adjustment step provides a zone in which the liquid removal is preferably only less than 10%, more preferably less than 8% and most preferably less than 6% of the total liquid content per unit length of the first catalyst layer on the substrate. One method for removing that portion of the liquid component is the application of an airflow through the channels of the substrate via either a vacuum suction or a blowing with compressed air. The airflow may be applied for a duration of only less than about 30 seconds, preferably less than about 20 seconds, and more preferably less than or equal to about 15 seconds (for a length of the substrate of 50 mm to 300 mm) and may be performed with a gas, preferably ambient air or compressed air, with the air either heated or unheated, dry air or humidified air, with or without one or more low volatility additives. In a very preferred manner the air is submitted through the substrate with a speed of >20 m/s, preferably 20-40 m/s and a moisture content of less than or equal to 10 g $H_2O$/kg air, preferably less than or equal to 5 g $H_2O$/kg air. The temperature of the air is advantageously controlled to be between 20° C. and 90° C., preferably between 40° C. and 50° C. The duration of the airflow is adjusted according to above ranges depending on the properties of the washcoat (e.g., solid content, layer thickness, viscosity, etc.). This yields a focus adjusted zone at the air introduction side of about 5%-10% of the total length of the substrate. Though the foregoing example discusses the use of an air flow, the focused adjustment step may instead be performed with a fluid flow of other gases for forming a focus adjusted zone.

As discussed earlier, in order to advantageously produce overlaying catalyst layers a first catalyst slurry is applied to a substrate from the top to some length down within the substrate. In a second step a portion of the liquid content of a washcoat is removed from the first catalyst layer as stipulated in the above mentioned modified process, via a focused adjustment step. In the focused adjustment step, a liquid removal medium may be introduced from either end of the substrate, though preferably is introduced from the same end that the first catalyst slurry was introduced. Next the substrate is turned upside-down for introduction of a second catalyst slurry from an end of the substrate opposite that end at which the first catalyst slurry was introduced. Upon turning the substrate, the focus adjusted zone then resides at the opposite end of the substrate from that end which the second catalyst slurry is to be introduced. In this way, while introducing the second catalyst slurry over the still wet first catalyst, the focus adjusted zone will provide a liquid absorption characteristic that stops the flow of the second catalyst slurry from exiting the opposite end of the substrate, as illustrated in FIG. 1.

In this modified process, the first catalyst slurry may be distributed along the entire length of the substrate, or along less than the entire length of the substrate, such that the first catalyst layer is formed either along the entire length of the substrate, or along less than the entire length of the substrate. Since the second catalyst layer will be stopped by the focus adjusted zone, as illustrated in FIG. 1, the second catalyst slurry is distributed along less than the entire length of the first catalyst layer, and this along less than the entire length of the substrate, such that the second catalyst layer is formed along less than the entire length of the first catalyst layer and along less than the entire length of the substrate. The overlapping part of the catalyst layers can preferably be as large as 98%, preferably 50%-95% of the length of the substrate. This process can be repeated with further catalysts slurries to be coated over the preceding ones by applying the present modification.

Still according to this modifications all aspects mentioned favorably for the present invention may also be applied for this modification if applicable within the limits mentioned above for this modification.

To the extent necessary to understand or complete the disclosure of the present invention, all publications, patents, and patent applications mentioned herein are expressly incorporated by reference herein to the same extent as though each were individually so incorporated. No license, express or implied, is granted to any patent incorporated herein. Ranges expressed in the disclosure include the endpoints of each range, all values in between the endpoints, and all intermediate ranges subsumed by the endpoints.

What is claimed is:

1. A method of coating a substrate, comprising:
   distributing a first catalyst slurry having a first catalytic composition and a first initial viscosity within the substrate to form a first catalyst layer within the substrate;
   adjusting a viscosity of the first catalyst layer such that the first catalyst layer is made to have a first adjusted viscosity that is greater than the first initial viscosity of the first catalyst slurry; and
   distributing a second catalyst slurry having a second catalytic composition and a second initial viscosity within the substrate to form a second catalyst layer within the substrate,
   wherein the second catalytic composition differs from the first catalytic composition, and the second initial viscosity is less than the first adjusted viscosity,
   wherein the second catalyst slurry is distributed within the substrate while the first catalyst layer is in a wet state such that the second catalyst layer is formed as a wet-on-wet coating that at least partially overlaps the first catalyst layer,
   wherein the first and second catalytic compositions both comprise one or more rheology modifiers, the one or more rheology modifiers being a linear or branched-chain poly-functionalized organic molecule having two to twelve carbon atoms in the chain ($C_n$; wherein $2 \leq n \leq 12$) and a carbon backbone that is saturated or unsaturated in either a cis- or trans-configuration, and
   wherein the organic molecule is functionalized with at least one carboxylic acid moiety, and at least one additional functional moiety that is a carboxyl, a hydroxyl, or a carbonyl.

2. The method of coating a substrate according to claim 1, wherein the first catalyst slurry has a thixotropic rheology with a reversible shear-thinning hysteresis, and the method further comprises,
   holding the first catalyst slurry, prior to distributing within the substrate, in a containment vessel that is in fluid-flow communication with the substrate, and applying a shearing force to the first catalyst slurry, while held in the containment vessel, to level the first catalyst slurry within the containment vessel.

3. The method of coating a substrate according to claim 2, wherein applying a shearing force to the first catalyst slurry, while held in the containment vessel, comprises,
   inducing vibration or applying mechanical shear to the containment vessel.

4. The method of coating a substrate according to claim 2, wherein applying a shearing force to the first catalyst slurry, while held in the containment vessel, comprises,
   applying an ultrasound energy to the first catalyst slurry and/or the containment vessel.

5. The method of coating a substrate according to claim 2, wherein the second catalyst slurry has a thixotropic rheology with a reversible shear-thinning hysteresis, and the method further comprises,
   holding the second catalyst slurry, prior to distributing within the substrate, in the containment vessel, and
   applying a shearing force to the second catalyst slurry, while held in the containment vessel, to level the second catalyst slurry within the containment vessel.

6. The method of coating a substrate according to claim 1, wherein the first catalyst slurry has a thixotropic rheology with a reversible shear-thinning hysteresis, and distributing the first catalyst slurry within the substrate and forming the first catalyst layer comprises:
   applying a shear force that acts to reduce the viscosity of the first catalyst slurry and to distribute the first catalyst slurry within the substrate to form the first catalyst layer, and
   ceasing application of the shear three, after distributing the first catalyst slurry to form the first catalyst layer, to increase the viscosity of the first catalyst composition and inhibit mobility of the first catalyst layer.

7. The method of coating a substrate according to claim 6, wherein the second catalyst slurry has a thixotropic rheology with a reversible shear-thinning hysteresis, and distributing the second catalyst slurry within the substrate and forming the second catalyst layer comprises:
   applying a shear force that acts to reduce the viscosity of the second catalyst slurry and to distribute the second catalyst slurry within the substrate to form the second catalyst layer, and
   ceasing application of the shear force, after distributing the second catalyst slurry to form the second catalyst layer, to increase the viscosity of the second catalyst composition and inhibit mobility of the second catalyst layer.

8. The method of coating a substrate according to claim 1, wherein distributing the first catalyst slurry within the substrate and forming the first catalyst layer comprises,
   distributing the first catalyst slurry along less than the entire length of the substrate, such that the first catalyst layer is formed along less than the entire length of the substrate.

9. The method of coating a substrate according to claim 1, wherein adjusting the viscosity of the distributed first catalyst layer comprises,
   removing a portion of a liquid component of a washcoat of the first catalyst layer, wherein the first catalyst layer remains in a wet state following removal of the portion of the liquid component.

10. The method of coating a substrate according to claim 9, wherein removing the portion of the liquid component of the washcoat of the first catalyst layer comprises,
    applying an airflow through the channels of the substrate.

11. The method of coating a substrate according to claim 1, further comprising,
    adjusting a viscosity of the second catalyst composition such that the second catalyst layer has a second adjusted viscosity that is greater than the second initial viscosity of the second catalyst slurry; and
    distributing a third catalyst slurry having a third catalytic composition and a third initial viscosity within the substrate to form a third catalyst layer within the substrate,
    wherein the third catalytic composition differs from the second catalytic composition, and the third initial viscosity is less than the second adjusted viscosity, and
    wherein the third catalyst slurry is distributed within the substrate while the second catalyst layer is in a wet state such that the third catalyst layer is formed as a wet-on-wet coating that at least partially overlaps the second catalyst layer.

12. The method of coating a substrate according to claim 1, further comprising,
    coating the substrate with a predetermined number of catalyst layers to form a loaded substrate; and
    drying and/or calcining the loaded substrate only after all predetermined number of catalyst layers are coated on the substrate.

* * * * *